March 23, 1954     A. F. BROZ     2,673,061
VALVE OF THE HYBRID POPPET-BUTTERFLY TYPE
Filed Aug. 14, 1950     2 Sheets-Sheet 1

INVENTOR
Albert F. Broz
BY
ATTORNEY

March 23, 1954
A. F. BROZ
2,673,061
VALVE OF THE HYBRID POPPET-BUTTERFLY TYPE
Filed Aug. 14, 1950
2 Sheets-Sheet 2
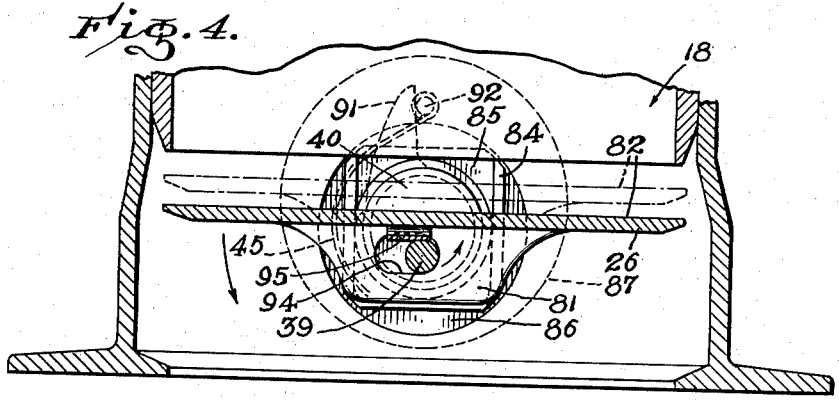
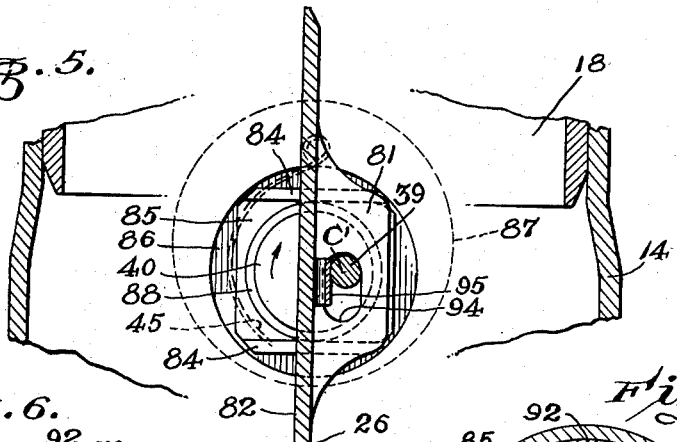
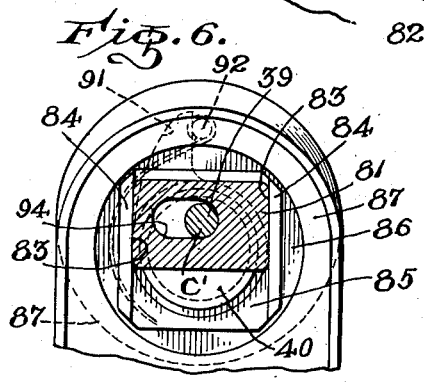
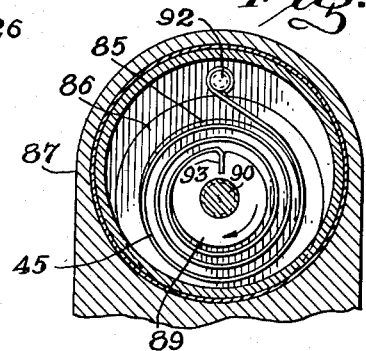
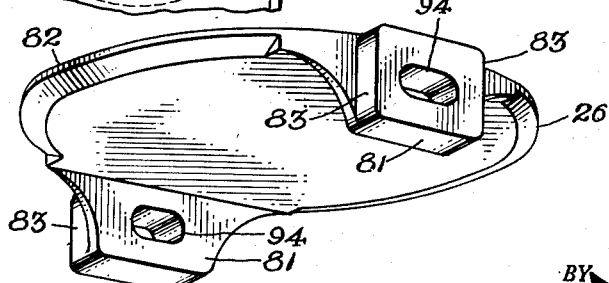
INVENTOR.
Albert F. Broz
BY
ATTORNEY.

Patented Mar. 23, 1954

2,673,061

UNITED STATES PATENT OFFICE 2,673,061

VALVE OF THE HYBRID POPPET-BUTTERFLY TYPE

Albert F. Broz, Woodland Hills, Calif., assignor to William S. Woods, Huntington Park, and Verna M. Wittman, South Gate, Calif.

Application August 14, 1950, Serial No. 179,335

6 Claims. (Cl. 251—11)

This invention relates to valve mechanisms and particularly pertains to a self-clearing valve structure.

In the delivery of fluid through a conduit it is often desirable to free the conduit of any obstruction so that the valve member will not set up any currents or create friction which would resist the free flow of the fluid through the conduit. Heretofore it has been common to construct a valve having a housing and a valve element which moves axially toward and away from a seat to produce an annular orifice of varying area. Such valves are commonly known as valves of the poppet type. Valves with rotating disc valve elements are known as butterfly valves. Both types, when open, partially obstruct the conduit through which the fluid flows, with varying degrees of retardation of fluid flow. The butterfly valve, in this respect, is less objectionable than the poppet valve, since it provides a greater degree of clearance when open, and permits a greater extent of undeflected axial flow, with correspondingly less turbulence and, consequently, less flow resistance. However, the poppet valve has the advantage, over the butterfly valve, of providing a tight seal, with substantially complete shut-off, in the closed position, whereas the common butterfly valve is inherently incapable of effecting a fluid-tight seal.

The present invention is directed to a hybrid type valve embodying characteristics and corresponding advantages of both the poppet and the butterfly valve. Such valves, characterized generally by a two-stage movement which, in the opening stage, commences with axial unseating movement of the poppet valve and ends with the characteristic swinging or rotating movement of the butterfly valve, have been hitherto proposed. However, to the best of my knowledge, none of them prior to the present invention have been sufficiently satisfactory to attain commercial usage.

The general object of the invention is to provide a valve of such a hybrid type, which embodies an improved arrangement of mechanism for effecting the two stage movement referred to above. More specifically, the invention aims to provide improved mechanism for converting a simple rotary movement of an actuator shaft into a two stage combination of successive axial and rotating movements of a valve disc.

A specific object of the invention is to provide a valve of this type having means to effect a truly axial, linear movement of the valve element in its final stage of closing movement, so that the maximum benefit of tight sealing of characteristic poppet action can be obtained. A further object is to accomplish this in a valve that is relatively simple in construction yet fully dependable in operation. Toward the attainment of these objects, the invention provides a valve having means to yieldingly urge rotation of the valve element in one direction, together with stop means for arresting such rotation in the position of coaxiality of valve element and seat, such stop means functioning as a guide to allow axial movement of the valve element while cooperating with the yielding means to maintain such coaxiality during the axial movement.

A further object is to provide, in such a valve, an arrangement whereby the movable valve element may be self-aligning and whereby an eccentric actuator may move to an over-center position in which it will become self-locking to lock the valve in closed position.

Another object of the invention is to provide a valve structure which effects an efficient seal for interrupting the flow of fluid through a conduit and in which the valve, in opening, will move to a fully unobstructing position to permit a fluid flow at full capacity of the conduit.

The invention contemplates the provision of a tubular housing interposed in a length of conduit through which a fluid is to pass, said housing being formed with a valve seat, the axis of which extends longitudinally of the passageway and which seat receives a valve element of disc form, supported by actuating means by which the valve element may be lifted from its seat and swung to a free and unobstructing position in the housing and vice versa. The structure also contemplates remote control means for opening and closing the valve.

The invention is illustrated by way of example in the accompanying drawings in which:

Fig. 1 is a cross-sectional view of a valve embodying the invention;

Fig. 2 is an axial section of the same, in the closed position, taken on the line 2—2 of Fig. 1. Valve element 26 is coupled close to the axis C' of rotation of trunnions 85 and 85' of a valve actuator crank on which valve element 26 is carried;

Fig. 4 is an axial section of the same, in a partially open position;

Fig. 5 is an axial section of the same, in the fully open position;

Fig. 6 is a detail sectional view of the same, taken on the line 6—6 of Fig. 1;

Fig. 7 is a detail sectional view of the same, taken on the line 7—7 of Fig. 1;

Fig. 8 is a perspective view of the valve element of Fig. 1.

Figure 1:
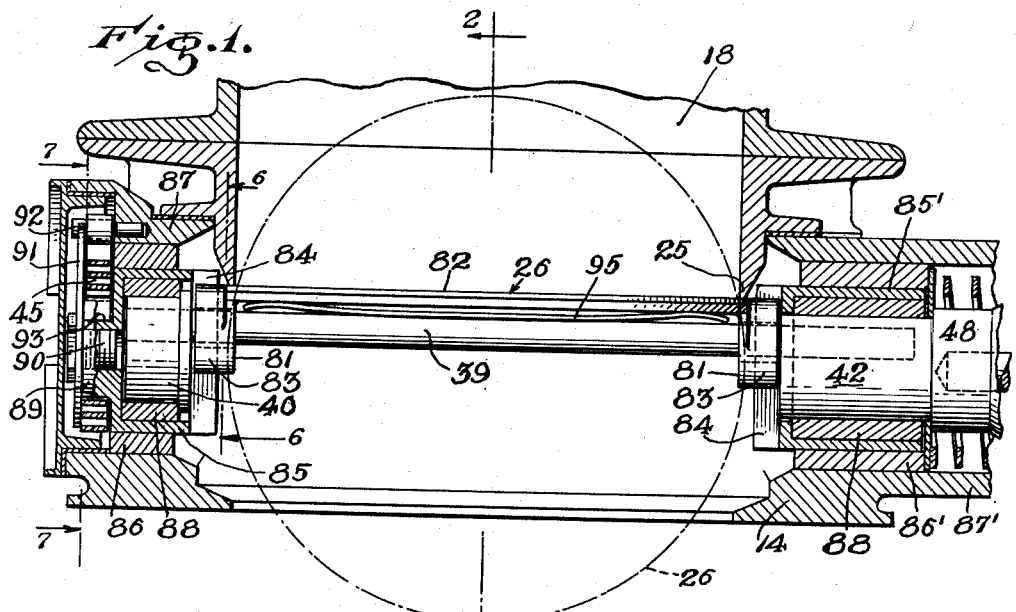

As an example of one form in which the invention may be embodied, I have shown in the drawings a valve embodying a casing 14 which is adapted to be inserted between a pair of aligned tube sections one of which is indicated at 18. Rotatably mounted in casing 14 is a valve element 26.

Valve element 26, as shown in Fig. 8, comprises a disk having diametrically opposed ears 81 projecting rearwardly from the seating face 82 of the disk. Ears 81 have parallel shoulders 83 which are embraced between guideways 84 formed on the inner ends of hollow cylindrical mounting trunnion members 85, 85' the latter being journalled in bearing bushings 86, 86' mounted within hollow bosses 87, 87' of the valve housing 14. Trunnion 85' is in the form of an open ended sleeve through which operating crank member 42 extends, with a bearing bushing 88' interposed. Trunnion 85 is cup shaped, having a bottom which is extended to provide a shank 89 against which is secured, by a screw 90, threaded thereinto, a stop finger 91. Spring 45 is confined between stop finger 91 and the bottom of trunnion 85. Finger 91 engages a pin 92, anchored in boss 87, to limit the rotation of trunnion member 85 in one direction. One end of spring 45 is anchored to pin 92 and the other end is inserted into a slot 93 in shank member 89. Spring 45 is loaded so as to tend to maintain finger 91 in engagement with pin 92. In such position of engagement, it maintains trunnion 85 with its ways 84 disposed parallel to the major axis of the valve passage 18, and by reason of the confinement of ear shoulders 83 between ways 84, valve element 26 will be positioned at right angles to said major axis. At this point it may be noted that with guideways 84 in this position, shoulders 83 may slide between ways 84 so as to provide guided linear movement of valve element 26 in coaxial, parallel relation to the valve seat. The normal position of valve element 26 to the passage axis may be accurately adjusted by loosening screw 90 and rotatably adjusting finger 91 about screw 90.

The movements of valve element 26 are controlled by an eccentrically disposed crank rod 39 the ends of which are fixed in the respective crank members 40 and 42. Crank rod 39 extends through elongated slots 94 in ears 81, slots 94 being parallel to the plane of valve disk 26. Slots 94 are somewhat wider than rod 39, so as to provide for lost motion between valve element 26 and rod 39, parallel to the axis of the valve element, when the valve element is pressed against the seat 25. A yielding action of valve element 26 under such seating pressure is provided for by a bow spring 95, the central web of which engages rod 39 and the ends of which press against (and may be attached to) the rear side of the valve disk.

Slots 94 are positioned eccentrically with reference to the center of the valve disc so as to permit arcuate swinging movement of crank rod 39 through a path of less than 360 degrees.

Operation

In the operation of the valve, drive is transmitted through drive shaft 48. Rotation is transmitted back and forth between trunnion members 85 and 85' by valve element 26, so that no appreciable torsional misalignment of these trunnions can occur under the opposing torsional forces exerted by spring 45 and shaft 48, and that drive from crank member 42 to valve element 26 is transmitted largely through the engagement of rod 39 with the ear 81 immediately adjacent crank member 42. Rod 39 extends through both ears in order that it may provide proper positioning of both sides of the valve element 26.

Figure 2:
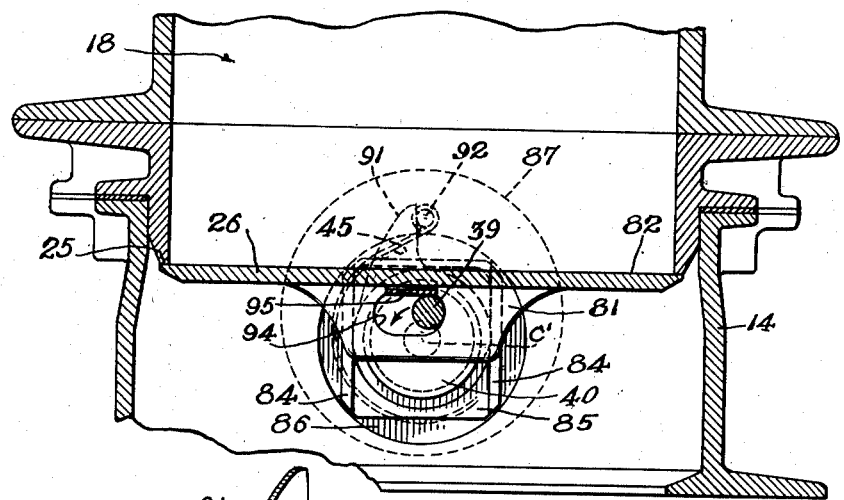
Figure 3:
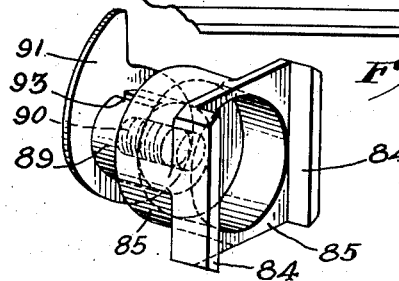
Fig. 3 is a perspective view of a part of the valve mounting mechanism.

Referring first to Figs. 1 and 2, which show the valve in the closed position, in the initial stage of valve opening crank rod 39 will commence to rotate counterclockwise as indicated by the arrow in Fig. 2, passing dead center against the yielding resistance of spring 95, so as to unlock the valve element, then rotating away from valve element 26, until it engages the sides of slots 94 away from the valve disk, whereupon its further rotation will draw the valve disk away from the seat in a linear motion guided by a cooperative action of spring 45 (in maintaining guideways 84 parallel to the axis of passage 18) and the sliding movement of shoulders 83 between guideways 84. This linear unseating movement will continue until crank rod 39 reaches the position shown in Fig. 4, somewhat more than 180 degrees beyond its starting position of Fig. 2, whereupon rod 39 will engage the extremities of slots 94 so that further rotation of the crank rod 39 will be transmitted through ears 81 to valve element 26. Further operation will continue until another 90 degrees of rotation of crank members 42 and 40 has transpired, whereupon valve element 26 will arrive at the fully open position shown in Fig. 5. In the rotation of the valve element during this last stage of operation, trunnions 85 and 85' will rotate against the resistance of spring 45 applied to trunnion 85.

In the closing operation, spring 45 will rotate trunnions 85, 85' from the position of Fig. 5 back to the position of Fig. 4 in unison with the return of crank rod 39 from its Fig. 5 position to its Fig. 4 position. In the further movement of crank rod 39 clockwise from its Fig. 4 to its Fig. 2 position, it will exert a camming action in slots 94 to move valve element 26 linearly back to the seating position, rotation of trunnions 40, 42 beyond the position of Fig. 4 having been arrested by the engagement of stop finger 91 with pin 92. Thus the final stage of closing movement of valve element 26 will be a truly linear movement throughout which it maintains a coaxial, parallel relation to the valve seat.

From an examination of the present structure and a study of the function of its operation it will be evident that the valve structure herein shown is simple in construction, is compact and rugged and not likely to get out of order, and furthermore the valve may function under remote control automatically.

While I have shown the preferred forms of my invention as now known to me, it will be understood that various changes may be made in the combination, construction, and arrangement of parts by those skilled in the art without departing from the spirit of the invention as claimed.

I claim:

1. In a valve of the hybrid poppet-butterfly type, means defining a valve seat; a valve element; eccentric actuator means on which said valve element is pivotally mounted; crank means carrying said actuator means and rotatable about an axis to which said actuator means is eccentric, for imparting arcuate swinging movement to said actuator means; yielding means constantly biasing said valve element for pivotal movement in one direction; and stop means for limiting said pivotal movement in said one direction only, at a position where the valve element is coaxial with the valve seat, guide means cooperating with said yielding means to guide said valve element in axial seating and unseating movements, said eccentric actuator means being arranged with reference to said valve element to have a stage of camming movement in which it effects said axial movement of the valve element and a stage of positive drive transmitting association with the valve element in which it effects pivotal movement of said valve element about said crank axis against the resistance of said yielding means, said yielding means further functioning to effect return pivotal movement of said valve element in step with return movement of said eccentric actuator means.

2. In a valve of the hybrid poppet-butterfly type, a housing defining a flow passage and having a valve seat normal to said passage, a valve element, eccentric actuator means on which said valve element is pivotally mounted, crank means carrying said actuator means and rotatable about an axis with reference to which said actuator means is eccentric for imparting arcuate swinging movement to said actuator means, yielding means constantly biasing said valve element for pivotal movement in one direction, and stop means limiting said pivotal movement in said one direction only, at a position where the valve element is coaxial with the valve seat, means defining a slideway for guiding the valve element in axial seating and unseating movements with the cooperative assistance of said yielding means, said actuator means being arranged with reference to said valve element to have a stage of camming movement, in which it effects the said axial movements of the valve element, and a stage of positive drive transmitting association with said valve element in which it effects the pivotal movement of said valve element against the resistance of said yielding means around said crank axis, said yielding means functioning to effect return pivotal movement of said valve element in step with return movement of said actuator means.

3. In a valve of the hybrid poppet-butterfly type, means defining a valve seat and a flow passage communicating therewith; a valve element adapted to seat on said seat to close said passage; means on which said valve element is mounted for successive axial and pivotal movements such as to move said valve element from the seating position to an open position in a plane at right angles to that of the valve seat, stop means for limiting pivotal movement of said valve element in one direction only, at a position in which the valve element is coaxial with the seat, yielding means constantly biasing said valve element for pivotal movement in said one direction, and means cooperating with said yielding means to guide the valve element in axial seating and unseating movements from and to an intermediate partially open position, said mounting means including eccentric actuator means having a stage of camming movement relative to said valve element such as to effect said axial movements of the valve element and having a stage of positive drive transmitting association with the valve element in which it effects the pivotal movement of the valve from said intermediate position to said open position, said yielding means further functioning to effect return pivotal movement of said valve element in step with return movement of said eccentric actuator means.

4. In a valve element of the hybrid poppet-butterfly type, means defining a valve seat and a flow passage communicating therewith; a valve element, a pair of spaced arms projecting rearwardly from the respective sides of said valve element, rotatable crank means having eccentric actuator means pivotally connected to the respective arms and having a drive element adapted to make positive driving engagement with one of said arms; yielding means acting between said crank means and said valve element for biasing the valve element for pivotal movement in one direction, means providing a guide surface parallel to the axis of said valve seat, and stop means for limiting the pivotal movement of said valve element in said one direction only, and means carried by said crank means and cooperating with said guide surface and with said yielding means to guide the valve element in linear seating and unseating movements in which it remains coaxial with the valve seat, said drive element having a stage of arcuate swinging movement free of engagement with said arms, in which stage said eccentric actuator means is operative to transmit through said arms, the said axial movement of said valve elements, and said drive element having a stage of movement in which it engages said one arm and positively transmits through said one arm to said valve element pivotal movement of the valve element around the axis of rotation of said crank means from an intermediate position to a position lying in a plane substantially parallel to said valve seat axis, said yielding means further functioning to effect return pivotal movement of said valve element in step with return movement of said eccentric actuator means.

5. In a valve of the hybrid poppet-butterfly type, a housing having a valve seat and defining a flow passage communicating with said seat; a valve disc having a pair of ears projecting rearwardly therefrom, said ears having slots elongated parallel to said disk and having parallel slide shoulders disposed normal to the plane of said disk; a pair of trunnion members journalled in opposite sides of said housing and each having at its inner end a pair of slideways closely embracing said shoulders to provide for guided axial sliding movement of said valve element with reference to said trunnion members; operating crank means including portions journalled within the respective trunnion members and an intermediate crank rod eccentrically disposed with reference to the axis of rotation of said journalled portions, said crank rod extending through said slots; yielding means acting between at least one of said trunnion means and said housing for biasing the trunnion means for rotation of the valve element in one direction; stop means acting between at least one of said trunnion means and the housing for limiting such rotation in said one direction only, at a position of said valve element parallel to and coaxial with the valve seat, said slots being positioned and arranged so as to provide for one stage of arcuate swinging movement of said crank rod in which it has a camming movement relative to the valve disk for causing said shoulders to slide between said ways, guiding said valve disk in seating and unseating movements between the seated position and an intermediate position withdrawn from the valve seat while it retains said parallel coaxial relationship to said seat, and another stage of arcuate swinging movement in which said rod engages ends of said slots to transmit positive drive through said ears to said valve disk for pivoting the disk from said intermediate position to a position normal to the plane of said valve seat, said yielding means yieldingly resisting said pivotal movement and effecting return pivotal movement of the valve element back to the intermediate position in step with return swinging movement of said crank rod.

6. A valve as defined in claim 5, including spring means acting yieldingly between said crank rod and said valve disk to yieldingly transmit seating pressure from the crank rod to the disk, said crank rod being arranged for over-center movement past the axis of transmission of said seating pressure, said spring means yielding to accommodate said over-center movement.

ALBERT F. BROZ.

References Cited in the file of this patent

UNITED STATES PATENTS

| Number | Name | Date |
|---|---|---|
| 1,213,513 | Lohse | Jan. 23, 1917 |
| 1,595,038 | Vencl | Aug. 3, 1926 |
| 2,039,155 | Ewen | Apr. 28, 1936 |
| 2,169,696 | Hotchkiss | Aug. 15, 1939 |
| 2,229,414 | King | Jan. 21, 1941 |